United States Patent
Kim et al.

(10) Patent No.: US 8,827,817 B2
(45) Date of Patent: Sep. 9, 2014

(54) APPARATUS AND METHOD FOR COLLECTING GAME DATA

(75) Inventors: Ju-Young Kim, Daejeon (KR);
Dong-Chun Lee, Daejeon (KR);
Hang-Kee Kim, Daejeon (KR);
Kang-Min Sohn, Daejeon (KR); Chang Joon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 336 days.

(21) Appl. No.: 13/333,340

(22) Filed: Dec. 21, 2011

(65) Prior Publication Data

US 2012/0165103 A1 Jun. 28, 2012

(30) Foreign Application Priority Data

Dec. 22, 2010 (KR) .......................... 10-2010-0132866
Apr. 4, 2011 (KR) .......................... 10-2011-0030535

(51) Int. Cl.
*A63F 13/00* (2014.01)
*A63F 13/12* (2006.01)

(52) U.S. Cl.
CPC ........... *A63F 13/12* (2013.01); *A63F 2300/535* (2013.01); *A63F 2300/6045* (2013.01); *A63F 2300/407* (2013.01); *A63F 2300/534* (2013.01); *A63F 2300/646* (2013.01)
USPC .............................................. 463/43; 463/42

(58) Field of Classification Search
USPC ........................................ 463/1, 42, 43, 31
See application file for complete search history.

(56) References Cited

U.S. PATENT DOCUMENTS

| | | | |
|---|---|---|---|
| 2004/0143852 A1* | 7/2004 | Meyers | 725/133 |
| 2005/0164784 A1* | 7/2005 | Yamamoto et al. | 463/30 |
| 2006/0100021 A1* | 5/2006 | Yoshino et al. | 463/45 |
| 2007/0054716 A1* | 3/2007 | Hiruta | 463/1 |
| 2007/0117617 A1* | 5/2007 | Spanton et al. | 463/29 |
| 2008/0045283 A1* | 2/2008 | Stamper et al. | 463/1 |
| 2009/0156314 A1 | 6/2009 | Kim et al. | |

FOREIGN PATENT DOCUMENTS

KR    1020090065747    6/2009

OTHER PUBLICATIONS

Kim, Ju Young et al., "Methodology for Verifying the load limit point and bottle-neck of a game server using the large scale virtual clients," 10th International Conference on Advanced Communication Technology, ICACT 2008, vol. 1:382-386 (2008).

* cited by examiner

*Primary Examiner* — Damon Pierce
*Assistant Examiner* — Allen Chan
(74) *Attorney, Agent, or Firm* — Nelson Mullins Riley & Scarborough LLP; Anthony A. Laurentano, Esq.; Dipti Ramnarain, Esq.

(57) ABSTRACT

Disclosed herein is an apparatus for collecting game data in order to test performance of a game server. The apparatus includes a capture and filtering module, a control module, and a data management module. The capture and filtering module captures packets, transmitted and received between the game server and each of a plurality of game clients, using the plurality of game clients, and extracts a plurality of necessary data by performing filtering on the results of the capturing. The control module determines the movement route of a game character in such a way as to correspond to the plurality of necessary data, and controls the plurality of game clients based on the movement route. The data management module stores and manages the plurality of necessary data.

14 Claims, 3 Drawing Sheets

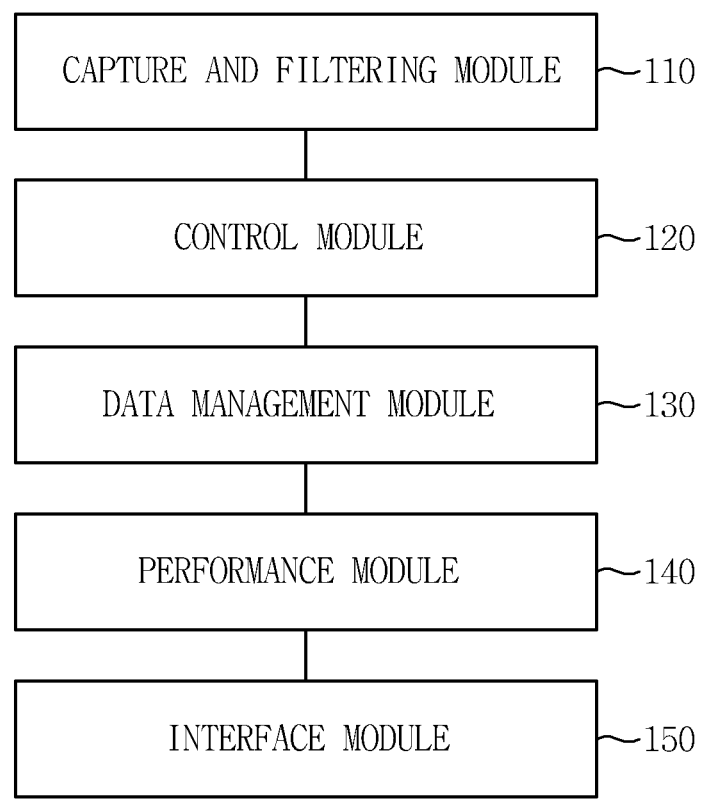

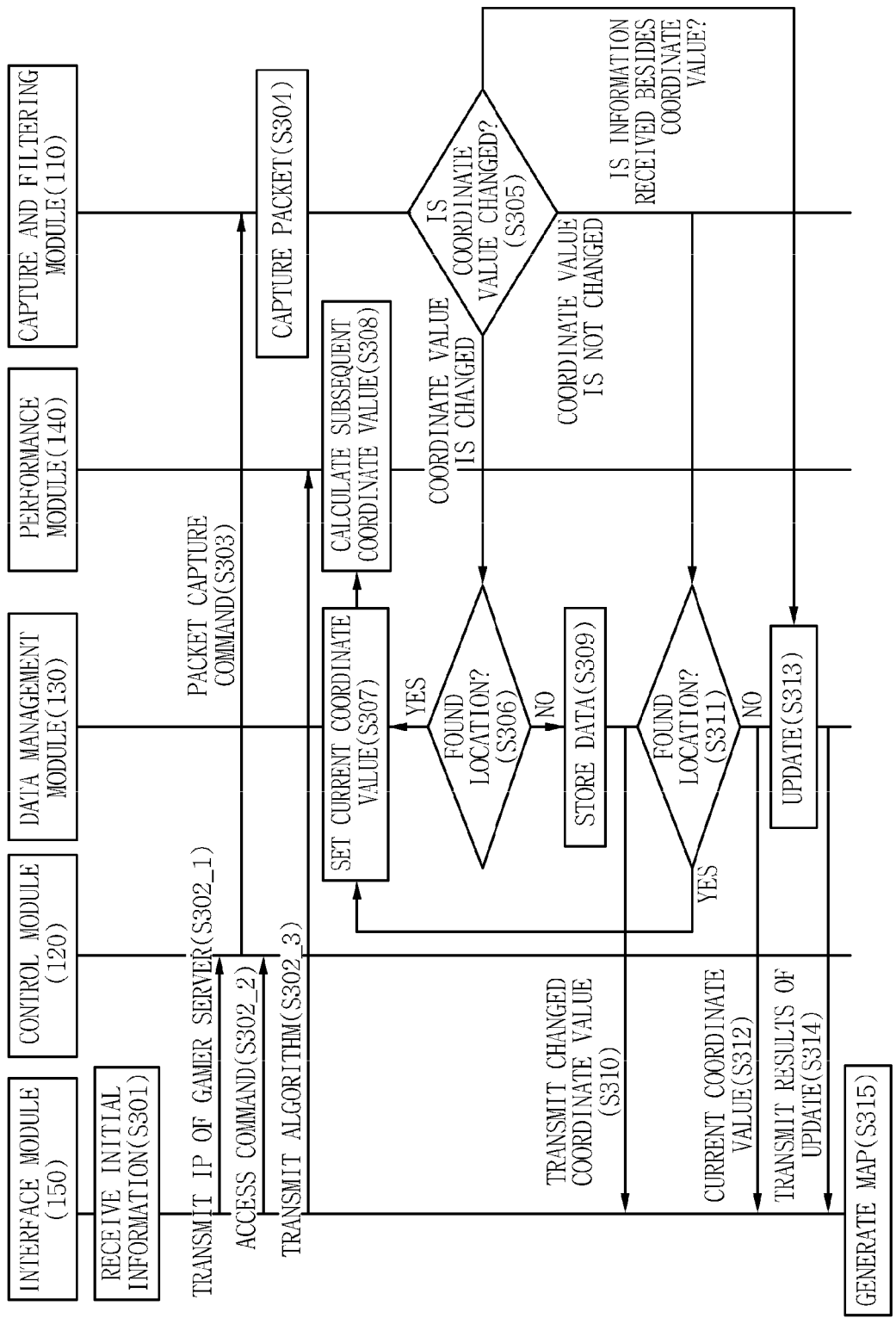

APPARATUS AND METHOD FOR COLLECTING GAME DATA

CROSS REFERENCE TO RELATED APPLICATIONS

This application claims the benefit of Korean Patent Application Nos. 10-2010-0132866 and 10-2011-0030535, filed on Dec. 22, 2010 and Apr. 4, 2011, which are hereby incorporated by reference in their entirety into this application.

BACKGROUND OF THE INVENTION

1. Technical Field

The present invention relates generally to an apparatus and method for collecting game data. More particularly, the present invention relates to an apparatus and method for collecting game data that is required when the performance of an online game server is tested.

2. Description of the Related Art

Virtual clients are clients which are made in order to substitute for real users when the performance of an online game server is tested. Such a virtual client is generally generated in such a way as to capture network packets between a game server and a game client, and is used in such a way as to make a real game client into a dummy client.

When a virtual client is generated in such a way as to capture network packets, the generated virtual client cannot know any other information besides that of communication packets exchanged with a game server, so that game data, such as information about topographies and Non-Player Characters (NPCs), cannot be obtained.

However, tests related to movement and hunting occupy the majority of the performance tests of an online game server and there are many cases in which game data, such as geographical data, NPC data, or monster data, is necessary to the process of performing such a performance test.

The performance test of an online game server includes a series of scenarios.

For example, in such a scenario, a character corresponding to a user logs in at a first location, moves to a second location and hunts some monsters, and then communicates with an NPC at a third location. According to an action corresponding to the movement from the first location to the third location in the scenario, the movement is performed along a route which is the same as the route which was found in a captured packet, if game data does not exist. That is, when the captured packet is copied and a plurality of packets is generated, an abnormal test, in which characters move in a line, is performed. In order to prevent such an abnormal performance test, an arbitrary coordinate value can be set. However, the arbitrary coordinate value may correspond to a topology, such as a cliff or under the sea, in which a character cannot move on a game map. Therefore, game data is required in order to perform a realistic performance test.

When there is no game data in the prior art, the progress of a performance test depends only on packets exchanged between a game server and a game client, so that there is a problem in that accurate results of the performance test cannot be obtained.

SUMMARY OF THE INVENTION

Accordingly, the present invention has been made keeping in mind the above problems occurring in the prior art, and an object of the present invention is to provide an apparatus and method for collecting game data that is required when the performance of an online game server is tested.

In order to accomplish the above-object, the present invention provides an apparatus for collecting game data in order to test performance of a game server, the apparatus including: a capture and filtering module for capturing packets, transmitted and received between the game server and each of a plurality of game clients, using the plurality of game clients, and extracting a plurality of necessary data by performing filtering on the results of the capturing; a control module for determining a movement route of a game character in such a way as to correspond to the plurality of necessary data, and controlling the plurality of game clients based on the movement route; and a data management module for storing and managing the plurality of necessary data.

The plurality of necessary data may include locational coordinates, vital power, magic power, and an experience level of the game character, a monster within an Area Of Interest (AOI) and Non-Player Characters (NPCs).

The locational coordinates may correspond to data necessary to determine height of topography and whether the game character can move over or not.

The apparatus may further include a performance module for generating a message corresponding to an event of a specific apparatus in such a way as to correspond to an algorithm which determines the movement route.

The specific apparatus may correspond to a keyboard or a mouse.

The control module may set an algorithm used to determine the movement route of the game character such that the movement route corresponds to the necessary data.

The apparatus may further include an interface module for visualizing the plurality of necessary data, and providing the visualized necessary data to a user.

In order to accomplish the above-object, the present invention provides a method for collecting game data in order to test performance of a game server, the method including: receiving initial information about the game server; performing control such that a game client connects to the game server based on the initial information; capturing packets, transmitted and received between the game server and the game client, and filtering results of the capturing; determining whether the coordinate value of a game character is changed based on the results of the filtering; and storing and managing necessary data such that the necessary data corresponds to the results of the determination as to whether the coordinate value is changed.

The necessary data may correspond to the results of the filtering, and may include at least one of locational coordinates, vital power, magic power, and an experience level of a game character, a monster within an AOI, and an NPC.

The initial information may include at least one of IPs of the game server and the game client, an algorithm corresponding to movement of the game character, and an initial coordinate value of the game character.

The determining may include: when the coordinate value is changed, determining whether the changed coordinate value corresponds to a previously found location; when the changed coordinate value corresponds to the previously found location, setting coordinates of an area which has not been found to a current coordinate value, and moving the game character from a location corresponding to the changed coordinate value to a subsequent location by applying a set algorithm to the game character; and when the changed coordinate value does not correspond to the previously found location, visualizing the changed coordinate value.

The determining may include: when the coordinate value is not changed, determining whether the coordinate value corresponds to the previously found location; when the coordinate value corresponds to the previously found location, setting the coordinates of the area which has not been found to the current coordinate value, and moving the game character from the location corresponding to the coordinate value to the subsequent location by applying the set algorithm to the game character; and when the coordinate value does not correspond to the previously found location, visualizing the changed coordinate value.

The storing and managing the necessary data may include visualizing the necessary data and providing the visualized necessary data to a user.

The storing and managing the necessary data may include: determining an amount of collected game data based on the necessary data; and generating a map used to determine areas to which the game character can move and areas to which the game character cannot move based on the results of the determination.

The generating the map may include displaying, at the area where the game character can move on the map, contours indicative of height information and places where monsters and NPCs appear.

BRIEF DESCRIPTION OF THE DRAWINGS

The above and other objects, features and advantages of the present invention will be more clearly understood from the following detailed description taken in conjunction with the accompanying drawings, in which:

FIG. 2 is a diagram schematically illustrating the game data collection apparatus according to the embodiment of the present invention; and FIG. 3 is a flowchart illustrating a method for collecting game data according to an embodiment of the present invention.

DESCRIPTION OF THE PREFERRED EMBODIMENTS

Figure 1:
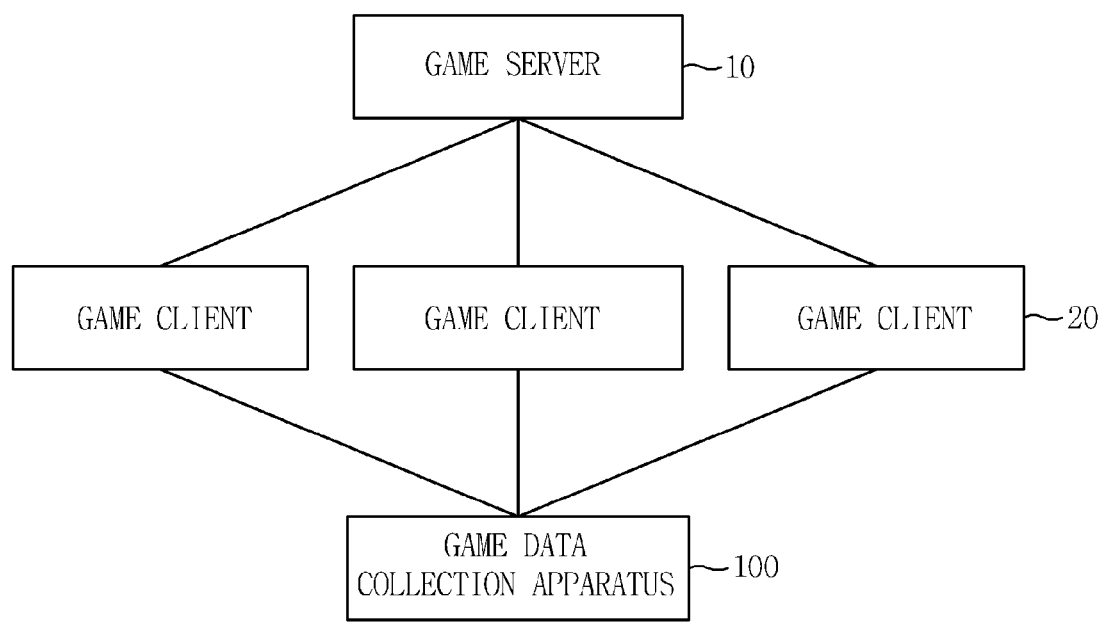
FIG. 1 is a diagram illustrating a service environment to which a game data collection apparatus according to an embodiment of the present invention is applied.

The present invention will be described in detail with reference to the accompanying drawings below. Here, when the description is repetitive and detailed descriptions of well-known functions or configurations would unnecessarily obscure the gist of the present invention, the detailed descriptions will be omitted. The embodiments of the present invention are provided to complete the explanation of the present invention for those skilled in the art. Therefore, the shapes and sizes of components in the drawings may be exaggerated to provide a more exact description.

A game data collection apparatus and method according to an embodiment of the present invention will be described in detail with reference to the accompanying drawings below.

First, a game data collection apparatus according to the embodiment of the present invention is an apparatus for previously collecting and storing game data in order to test the performance of an online game server, and can obtain data by automatically controlling a plurality of real game clients.

FIG. 1 is a diagram illustrating a service environment to which a game data collection apparatus according to an embodiment of the present invention is applied. FIG. 2 is a diagram schematically illustrating the game data collection apparatus according to the embodiment of the present invention.

Referring to FIG. 1, the service environment according to the embodiment of the present invention includes a game server 10, a plurality of game clients 20, and a game data collection apparatus 100.

A user can play a game by connecting to the game server 10 using one of the game clients 20. The game client 20 according to the embodiment of the present invention may correspond to the computer of the user and the present invention is not limited thereto.

While the user plays a game, network communication packets are transmitted and received between the game server 10 and the corresponding game client 20. Here, each of the network communication packets includes information such as the state and locational coordinates of the game client 20, one or more monsters in an Area Of Interest (AOI), and a Non-Player Character (NPC).

The game data collection apparatus 100 collects and stores game data such as the network communication packet. Additionally, the game data collection apparatus 100 includes the functions of controlling the client and generating one or more events in order to collect data.

Referring to FIG. 2, the game data collection apparatus 100 includes a capture and filtering module 110, a control module 120, a data management module 130, a performance module 140, and an interface module 150.

The capture and filtering module 110 captures all packets transmitted and received between the game server 10 and the game client 20, filters the results of the capture, and then extracts necessary data. Here, the necessary data includes status information such as the locational coordinates, vital power, experience level, and magic power of each of game characters, monsters within an AOI area and an NPC. For example, the locational coordinates of the game character may be used as data necessary to determine the height of topography and whether the topography can be moved over or not. That is, the game data collection apparatus 100 determines whether the corresponding character survives, an attack has occurred, and topography information based on the status information.

The control module 120 determines the movement route of the game character, which corresponds to the necessary data, and automatically controls the game client 20 based on the determined movement route.

Generally, a user directly controls the game character using a specific device such as a keyboard or a mouse. However, in the case of aiming to collect game data as in the present invention, there may be a case where a game should be played for a long period of time or a plurality of characters should be simultaneously controlled. Thus, it is not efficient for a user to control a game client using a keyboard or a mouse for a long period of time.

That is, since the game data collection apparatus 100 according to the embodiment of the present invention automatically controls the game client 20 based on the movement route, the movement route is an important element which increases the efficiency of the test.

Further, the control module 120 sets an algorithm used to determine the movement route of the game character corresponding to the necessary data.

The data management module 130 stores and manages the necessary data extracted by the capture and filtering module 110.

The performance module 140 generates an event message such that movement is realized according to the set algorithm.

Thereafter, the game data collection apparatus 100 may control the game client 20 using the performance module 140 as the user controls the game character using a specific device.

The interface module 150 visualizes and provides the necessary data extracted by the capture and filtering module 110. Further, the interface module 150 completes a map based on the extracted necessary data. Here, the map includes information indicative of areas to which the game character can and cannot move. Here, information about height such as the contour and about areas in which monsters and NPCs appear, is displayed in the areas to which the game character can move.

Although the game data collection apparatus 100 according to the embodiment of the present invention includes the capture and filtering module 110 and the performance module 140, the game client 20 may include the capture and filtering module 110 and the performance module 140 and the present invention is not limited thereto.

Next, a method of collecting game data will be described in detail with reference to FIG. 3.

FIG. 3 is a flowchart illustrating the method of collecting game data according to the embodiment of the present invention.

First, the game data collection apparatus 100 according to the embodiment of the present invention obtains game data between the game server 10 and the corresponding game client 20 while a user is playing a game, thereby providing an environment in which the performance of the online game server can be more accurately tested.

The game data collection apparatus 100 includes the capture and filtering module 110, the control module 120, the data management module 130, the performance module 140, and the interface module 150 in order to collect game data.

The user requests game start and data collection by inputting initial information using the corresponding interface module 150.

Referring to FIG. 3, the interface module 150 receives the initial information from the user at step S301. Here, the initial information includes the Internet Protocols (IPs) of the game server 10 and the game client 20, an algorithm corresponding to the movement of a game character, and initial coordinates of the game character.

Next, the interface module 150 transmits the IP of the game server 10 and an access command, which enables the game client 20 to connect to the corresponding game server 10, to the control module 120 based on the initial information at steps S302_1 and S302_2. Further, the interface module 150 transmits the algorithm, included in the initial information, to the performance module 140 at step S302_3.

The control module 120 transmits a packet capture command, which corresponds to the received access command, to the capture and filtering module 110 at step S303. Here, the control module 120 automatically performs control such that the game client 20 performs communication using the received IP of the game server 10.

Although the description has been to the effect that the capture and filtering module 110 according to the embodiment of the present invention is located in the game data collection apparatus 100, the capture and filtering module 110 may be located in the game client 20 and the present invention is not limited thereto.

The capture and filtering module 110 captures all the packets transmitted and received between the corresponding game server 10 and the game client 20, and performs filtering on the results of capturing in real time at step S304.

The capture and filtering module 110 determines whether the previous coordinate value of the game character has been changed based on the results of filtering at step S305. The capture and filtering module 110 compares the previous coordinate value with a current coordinate value, and transmits the fact as to whether the current coordinate value is changed to the data management module 130.

When the current coordinate value is changed, the data management module 130 determines whether the changed coordinate value (hereinafter referred to as "variation coordinate value") corresponds to a previously found location at step S306. Here, the previously found location includes the coordinate values of the game character managed by the data management module 130.

When the variation coordinate value corresponds to the previously found location, the data management module 130 changes the location of the client by setting the coordinates of an area which is not found to the current coordinates at step S307. The data management module 130 transmits the set coordinate value, that is, the variation coordinate value to the performance module 140. Thereafter, the performance module 140 moves the game character from a location corresponding to the variation coordinate value to a subsequent location by applying the set algorithm to the game character at step S308.

When the variation coordinate value does not correspond to the previously found location, the data management module 130 stores the variation coordinate value at step S309, and transmits the variation coordinate value to the interface module 150 at step S310. The interface module 150 visualizes and provides the received variation coordinate value to the user.

When the current coordinate value is not changed, the data management module 130 determines whether the initial coordinate value corresponds to the previously found location at step S311.

When the current coordinate value corresponds to the previously found location, the data management module 130 sets the coordinates of an area, which is not found, to a current location, and performs control such that the game character is moved from a location corresponding to the current coordinate value to a subsequent location by applying the set algorithm to the game character using the performance module 140.

When the current coordinate value does not correspond to the previously found location, the data management module 130 stores the current coordinate value, and transmits the current coordinate value to the interface module 150 at step S312. The interface module 150 visualizes and provides the received variation coordinate value to the user.

Further, the data management module 130 updates data using the necessary data received from the capture and filtering module 110 at step S313, and transmits the results of the update to the interface module 150 at step S314. Here, the necessary data is transmitted to the data management module 130 when the results of filtering performed by the capture and filtering module 110, that is, the necessary data corresponds to the status information about the monsters or the NPC. Thereafter, the interface module 150 performs a visualization task, such as the allocation or movement of monsters, based on the necessary data corresponding to the status information about the monsters or the NPC.

The interface module 150 determines the amount of collected game data based on the received necessary data corresponding to the status information about the current coordinate value, the variation coordinate value, the monsters and the NPC, and then generates a map used to detect areas, to which a game character can or cannot move, based on the amount of collected game data at step S315. Here, in the areas to which the game character can move, contours indicative of height information and places where monsters and NPCs appear are displayed.

As described above, the game data collection apparatus 100 according to the embodiment of the present invention may obtain and store the collected game data. Further, the game data collection apparatus 100 may enable more accurate tests to be performed by applying the game data to scenario configurations used to test a game server. Therefore, game users can obtain opportunities to receive high quality online game services.

According to the embodiments of the present invention, the game data collection apparatus may obtain and store collected game data. Further, the game data collection apparatus may enable more accurate tests to be performed by applying the game data to scenario configurations used to test a game server.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for collecting game data in order to test performance of a game server, the apparatus comprising:
   a capture and filtering module for capturing packets, transmitted and received between the game server and each of a plurality of game clients, using the plurality of game clients, and extracting a plurality of necessary data by performing filtering on results of the capturing;
   a control module for determining a movement route of a game character in such a way as to correspond to the plurality of necessary data, and controlling the plurality of game clients based on the movement route, wherein the determining comprises:
      when a coordinate value is changed, determining whether the changed coordinate value corresponds to a previously found location;
      when the changed coordinate value corresponds to the previously found location, setting coordinates of an area which has not been found to a current coordinate value, and moving the game character from a location corresponding to the changed coordinate value to a subsequent location by applying a set algorithm to the game character; and
      when the changed coordinate value does not correspond to the previously found location, visualizing the changed coordinate value; and
   a data management module for storing and managing the plurality of necessary data.

2. The apparatus as set forth in claim 1, wherein the plurality of necessary data comprises locational coordinates, vital power, magic power, and an experience level of the game character, a monster within an Area Of Interest (AOI) and Non-Player Characters (NPCs).

3. The apparatus as set forth in claim 2, wherein the locational coordinates correspond to data necessary to determine height of topography and whether the game character can move over or not.

4. The apparatus as set forth in claim 1, further comprising a performance module for generating a message corresponding to an event of a specific apparatus in such a way as to correspond to an algorithm which determines the movement route.

5. The apparatus as set forth in claim 4, wherein the specific apparatus corresponds to a keyboard or a mouse.

6. The apparatus as set forth in claim 1, wherein the control module sets an algorithm which determines the movement route of the game character in such a way as to correspond to the necessary data.

7. The apparatus as set forth in claim 1, further comprising an interface module for visualizing the plurality of necessary data, and providing the visualized necessary data to a user.

8. A method for collecting game data in order to test performance of a game server, the method comprising:
   receiving, using a processor, initial information of the game server;
   performing, using the processor, control such that a game client connects to the game server based on the initial information; capturing packets, transmitted and received between the game server and the game client, and filtering results of the capturing;
   determining, using the processor, whether a coordinate value of a game character is changed based on the results of the filtering, wherein the determining comprises:
      when the coordinate value is changed, determining whether the changed coordinate value corresponds to a previously found location;
      when the changed coordinate value corresponds to the previously found location, setting coordinates of an area which has not been found to a current coordinate value, and moving the game character from a location corresponding to the changed coordinate value to a subsequent location by applying a set algorithm to the game character;
      and when the changed coordinate value does not correspond to the previously found location, visualizing the changed coordinate value; and
   storing and managing, using the processor, necessary data such that the necessary data corresponds to results of the determination as to whether the coordinate value is changed.

9. The method as set forth in claim 8, wherein the necessary data corresponds to the results of the filtering, and comprises at least one of locational coordinates, vital power, magic power, and an experience level of a game character, a monster within an AOI, and an NPC.

10. The method as set forth in claim 8, wherein the initial information comprises at least one of Internet Protocols (IPs) of the game server and the game client, an algorithm corresponding to movement of the game character, and an initial coordinate value of the game character.

11. The method as set forth in claim 8, wherein the determining comprises: when the coordinate value is not changed, determining whether the coordinate value corresponds to the previously found location; when the coordinate value corresponds to the previously found location, setting the coordinates of the area which has not been found to the current coordinate value, and moving the game character from the location corresponding to the coordinate value to the subsequent location by applying the set algorithm to the game character;
   and when the coordinate value does not correspond to the previously found location, visualizing the changed coordinate value.

12. The method as set forth in claim 8, wherein the storing and managing the necessary data comprises visualizing the necessary data and providing the visualized necessary data to a user.

13. The method as set forth in claim 8, wherein the storing and managing the necessary data comprises: determining an amount of collected game data based on the necessary data; and generating a map used to determine areas to which the game character can move and areas to which the game character cannot move based on results of the determination.

14. The method as set forth in claim 13, wherein the generating the map comprises displaying, in the area where the game character can move on the map, contours indicative of height information and places where monsters and NPCs appear.

\* \* \* \* \*